United States Patent [19]

Ball et al.

[11] Patent Number: 4,747,023
[45] Date of Patent: May 24, 1988

[54] VEHICLE HEADLAMP ASSEMBLY

[75] Inventors: Daniel A. Ball, Anderson; Patrick J. Hurley, Fortville, both of Ind.

[73] Assignee: General Motors Corporation, Detroit, Mich.

[21] Appl. No.: 73,087

[22] Filed: Jul. 14, 1987

[51] Int. Cl.⁴ .............................................. B60Q 1/06
[52] U.S. Cl. ...................................... 362/66; 362/269; 362/272; 362/285
[58] Field of Search ................... 362/61, 66, 269, 273, 362/282, 285, 296, 297, 346

[56] References Cited

U.S. PATENT DOCUMENTS 3,932,837  1/1976  Baker .

Primary Examiner—Carroll B. Dority, Jr.
Attorney, Agent, or Firm—Edward J. Biskup

[57] ABSTRACT

A headlamp assembly having a spring plate member fastened through a pivot connection to the lamp body and formed with a pair of clip members and a pair of spring members for allowing the lamp body to be readily secured to a support panel of a motor vehicle and allow selective adjustment of the lamp body about a horizontal aim axis and a vertical aim axis.

3 Claims, 3 Drawing Sheets

VEHICLE HEADLAMP ASSEMBLY

This invention concerns vehicle headlamps in general and more particularly relates to aim adjustable headlamps normally incorporated in the front end of a vehicle.

More specifically, the present invention relates to a headlamp support arrangement that serves to facilitate mounting of a headlamp body to a support panel at the front end of a motor vehicle so as to allow selective adjustable movement of the headlamp body about a vertical aim axis and a horizontal aim axis. In the preferred form, the support panel at the front end of the motor vehicle is generally L-shaped and includes a vertically oriented wall and a horizontally oriented wall that together support the headlamp assembly. The headlamp assembly includes a lamp body which has a reflector member formed with first and second parabolic cavities located side by side for projecting light beams forwardly of the motor vehicle. The reflector member is also formed with first and second support shoes secured to the reflector member below the first and second cavities, respectively. A spring plate member serves to interconnect the lamp body to the support panel and, in this regard, is provided with a pair of laterally spaced clips for fastening the spring plate member to the frontal portion of the horizontally oriented wall of the support panel. The spring plate member also has a pair of spring members which engage the support shoes of the reflector member and serve to bias the support shoes towards the horizontally oriented wall. In addition, an arm is provided which is fixed to the spring plate member between the pair of spring members. The arm has a rear end adapted to be fastened to the horizontally oriented wall of the support panel so as to cooperate with the pair of clips of the spring plate member for preventing movement of the latter relative to the support panel. The front end of the arm serves to accommodate a stud member which is secured to the reflector member and allows adjustable movement of the headlamp body about the vertical aim axis while permitting the support shoes to slide fore and aft of the associated spring members during such adjustable movement of the headlamp body.

The objects of the present invention are to provide a new and improved headlamp assembly that includes all the parts needed for selectively adjustably aiming a lamp body about horizontal and vertical aim axes and that can be readily and quickly attached to the front panel of a motor vehicle; to provide a new and improved support arrangement for a headlamp assembly that includes a spring plate member which normally is secured to the reflector member of the headlamp and serves to facilitate attachment of the headlamp assembly to the front panel of a motor vehicle; and to provide a new and improved headlamp assembly which has a spring plate member fastened through a pivot connection to the lamp body and that is formed with a pair of clip members and a pair of spring members for allowing the lamp body to be readily secured to a support panel of a motor vehicle and allow selective adjustable movement of the lamp body about a horizontal aim axis and a vertical aim axis.

Other features and advantages of the present invention will be apparent from the following description when taken with the drawings in which FIG. 1 is a frontal elevational view of a headlamp assembly according to the present invention installed in the front end of a motor vehicle;

Figure 1:
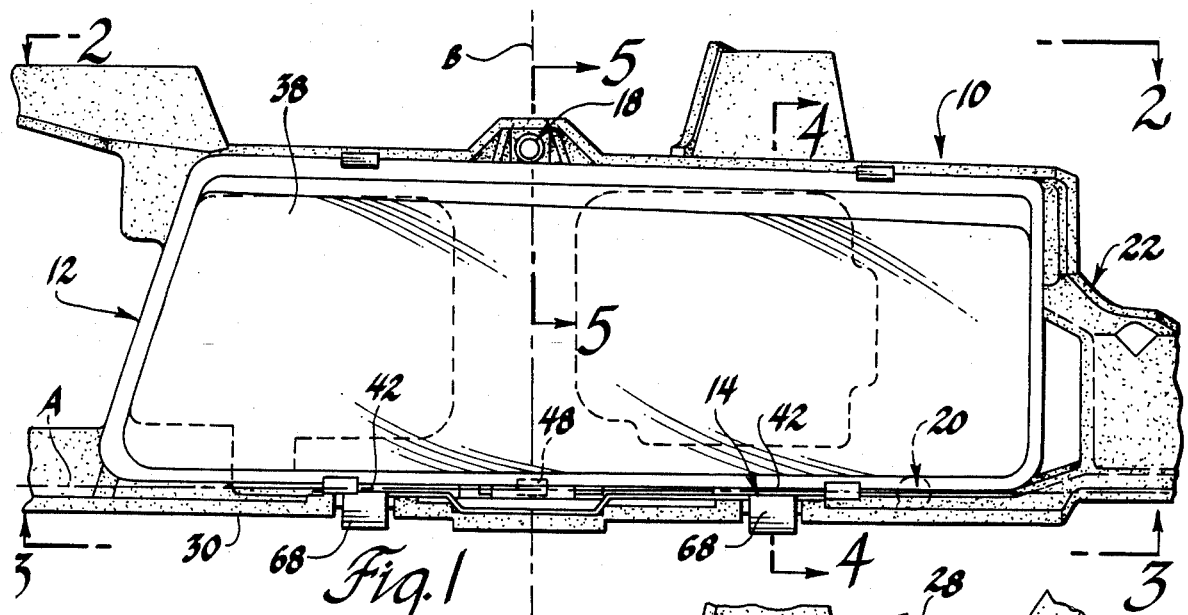
Figure 2:
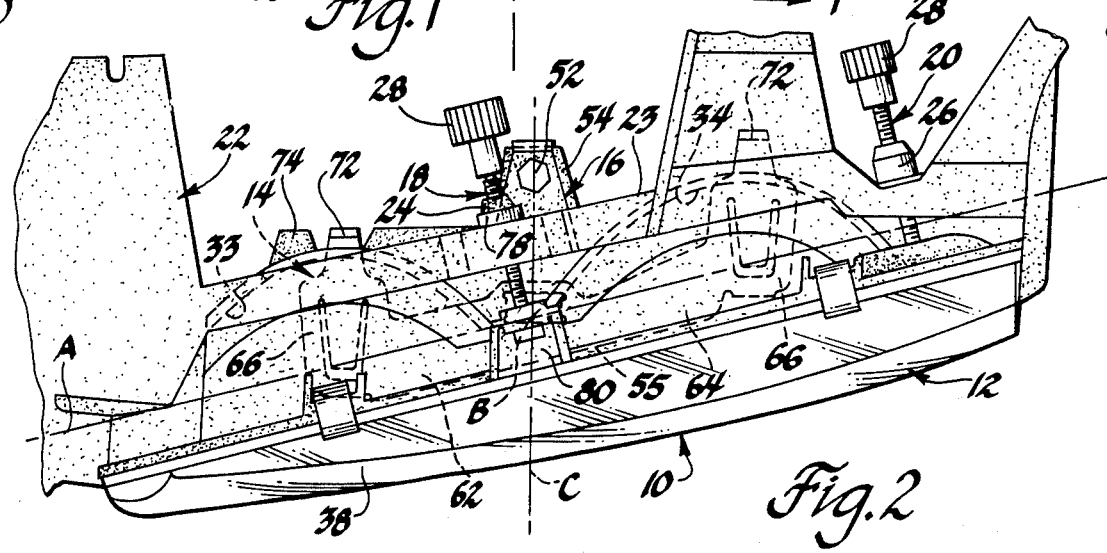
FIG. 2 is a top plan view of the headlamp assembly taken on line 2—2 of FIG. 1.

Referring now to the drawings and more particularly FIGS. 1 and 2 thereof, a headlamp assembly 10 is shown of the replaceable light bulb composite type made according to the present invention. The headlamp assembly 10 includes a lamp body 12, a spring plate member 14, a pivot arm 16, and a pair of adjustment screws 18 and 20. The headlamp assembly 10 is normally shipped as a unit to a vehicle manufacturer and thereafter is mounted to a support panel 22 fastened to the front end of a motor vehicle so as to permit selective adjustable movement of the lamp body 12 in a horizontal plane containing a horizontal aim axis A and a vertical plane containing a vertical aim axis B.

The support panel 22 in this case is made of plastic and is fastened to the sheet metal structure (not shown) at the frontal portion of the motor vehicle. The support panel 22 is L-shaped and includes a upstanding substantially vertically oriented wall 23 which serves to fixedly support the retainer nuts 24 and 26 in which the respective adjustment screws 18 and 20 are threaded so that upon manual rotation of the associated knobs 28, the screws attached thereto can be moved axially for repositioning the lamp body 12 about the aforementioned vertical aim axis and the horizontal aim axis. The support panel 22 also includes a substantially horizontally oriented wall 30 on which the lamp body 12 is mounted through the spring plate member 14 and the pivot arm 16 as will be more fully explained and described hereinafter.

Figure 4:
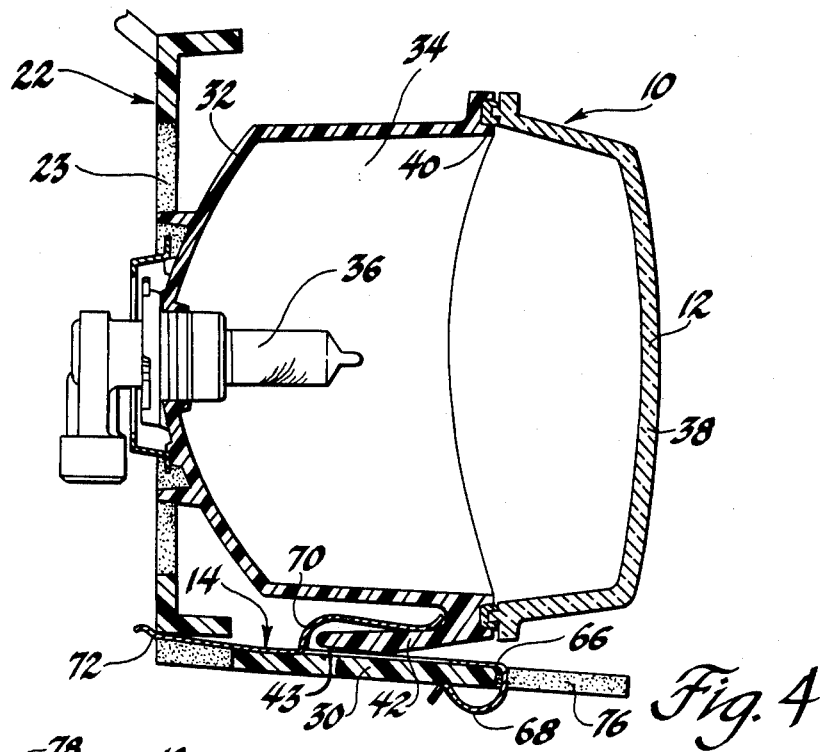
FIG. 4 is an enlarged sectional view taken on line 4—4 of FIG. 1 showing one of the two support shoes integrally formed with the reflector member of the lamp body.

The lamp body 12 includes a plastic reflector member 32 formed with a pair of side by side parabolic cavities 33 and 34 as seen in FIG. 2. The concave surface of each of the cavities 33 and 34 is aluminized so as to project a light beam forwardly and substantially parallel to an axis C. It will be noted that as shown in FIG. 2, the axis C is parallel to the longitudinal center axis of the associated vehicle (not shown) and the headlamp assembly 10 would be the right hand unit when looking at the front end of the vehicle as seen in FIG. 1. As should be apparent, the angled position of the headlamp unit is due to the rounded streamlined front end design currently popular with motor vehicles. Also, each of the parabolic cavities 33 and 34 in the reflector member 32 is provided with a single filament replaceable bulb 36 as seen in FIG. 4, located so as to cause the associated aluminized parabolic surface to project a light beam forwardly of the vehicle. The light bulb in the cavity 34 as seen in FIGS. 1 and 2 is provided with a filament located so as to allow the associated parabolic surface to project the so-called "low beam" when energized while the light bulb in the cavity 33 projects the so-called "high beam" when the filament thereof is energized. Thus, the lamp body 12 is actually two separate headlamps, a low beam unit and a high beam unit joined together so as to facilitate the aiming adjustment of both lamps.

The front of the reflector member 32 is closed by a glass or the like material lens 38, the rear marginal portion of which is sealingly received by a channel 40, as seen in FIG. 4, provided around the entire margin of the front portion of the reflector member 32. Centrally located below each of the cavities 33 and 34 of the reflector member 32 and integrally formed therewith is a support shoe 42 which extends rearwardly from the front lower edge of the reflector member 32. The pair of support shoes 42 are identical and each has the configuration shown in FIG. 4 that includes a generally curved lower surface 43.

Figure 7:
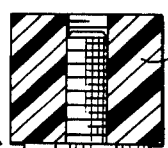
FIG. 7 is an enlarged view taken on line 7—7 of FIG. 6.
Figure 6:
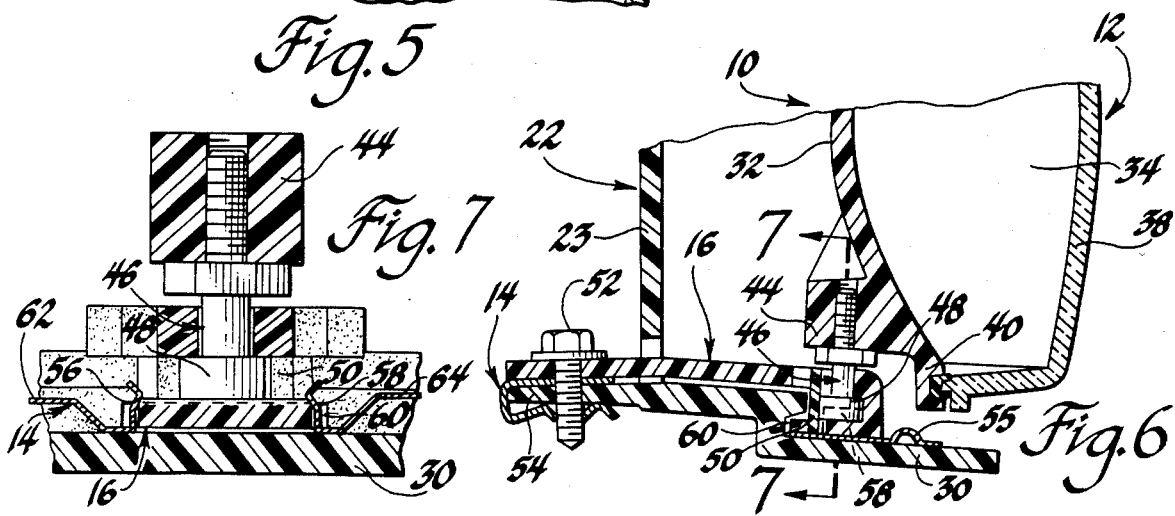
FIG. 6 is an enlarged sectional view with parts broken away taken on line 6—6 of FIG. 3.
Figure 8:
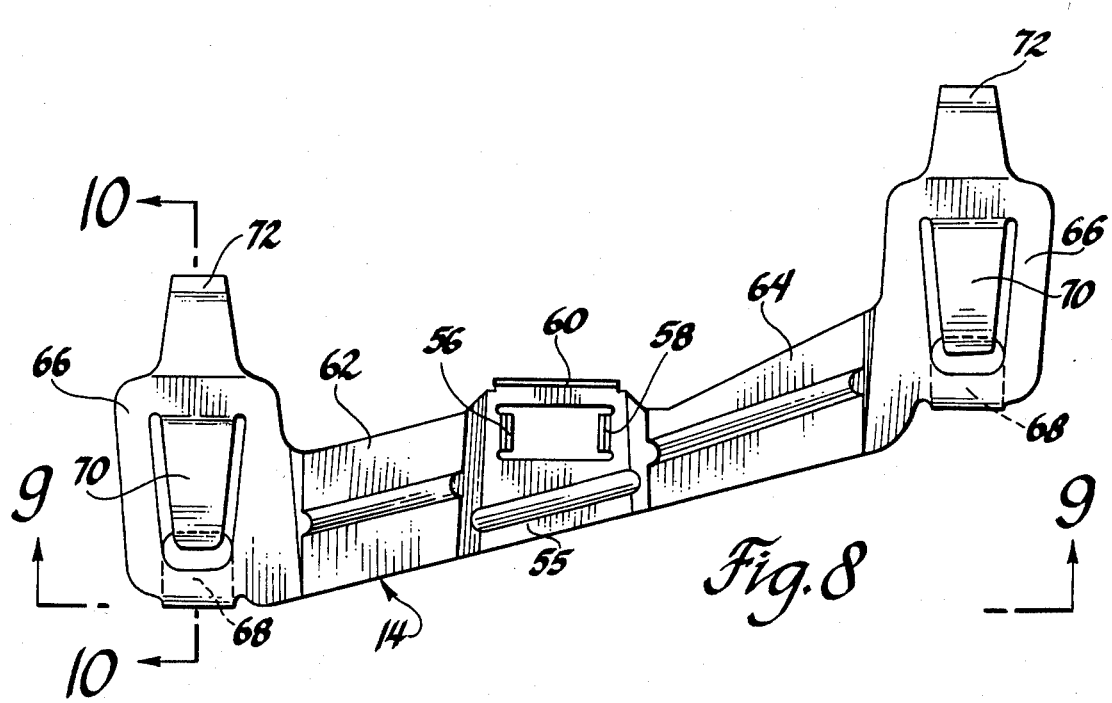
FIG. 8 is a top plan view of the spring plate member incorporated with the headlamp assembly shown in FIGS. 1 through 7.
Figure 9:
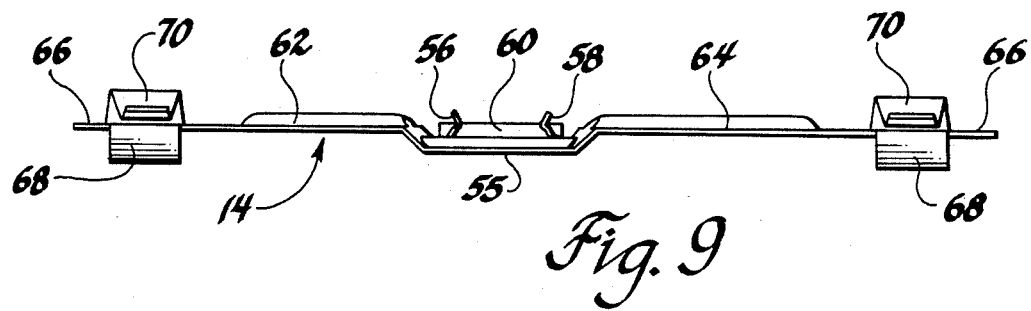
FIG. 9 is a frontal elevational view of the spring plate member of FIG. 8.

As aforementioned the headlamp assembly 10 normally includes the pivot arm 16 and the spring plate member 14 which, as seen in FIGS. 4, 6 and 7, serve to connect the lamp body 12 to the wall 30 of the support panel 22. In this regard, it will be noted that, as seen in FIG. 6, a rearwardly extending enlarged section 44 integral with the reflector member 32 between the cavities 33 and 34 has the upper portion of a stud member 46 threadably fastened therein while the lower portion of the stud member 46 is formed with a cylindrical head 48. The head 48 is located within a key-holed shaped slot formed in the upper surface of the front end of the pivot arm 16, and the head 48 is retained therein by a lock key 50 insertable into an accommodating aperture from the lower surface of the pivot arm 16 prior to attachment of the pivot arm 16 to the spring plate member 14. The rear end of the pivot arm 16 is secured by a cap screw 52 to an extension 54 integral with the lower wall 30 of the support panel 22. Thus, the stud member 46 serves as a pivot about which the lamp body 12 is movable about the vertical aim axis B upon rotation of the knob 28 associated with the adjustment screw 20.

Figure 10:
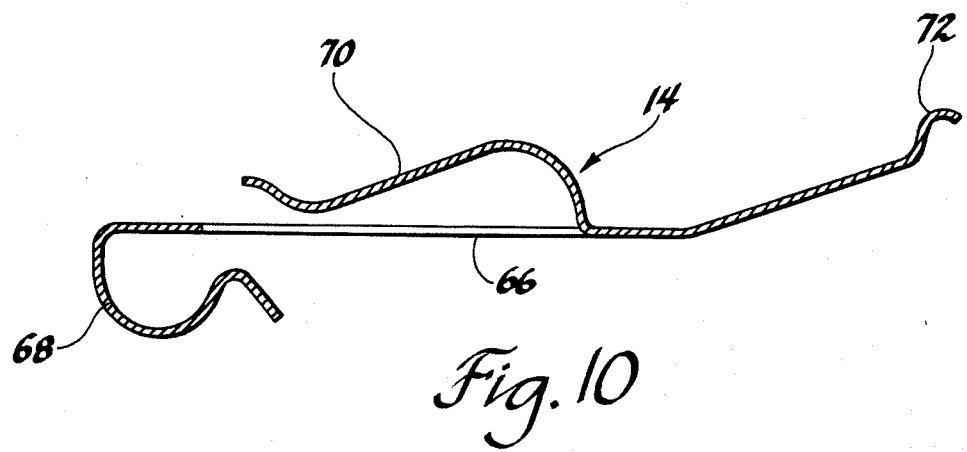
FIG. 10 is an enlarged sectional view taken on line 10—10 of FIG. 8.

The front end of the pivot arm 16 is retained by the central portion 55 of the spring plate member 14 and, in this regard, it will be noted that as seen in FIGS. 6, 7, 8 and 9 the central portion of the spring plate member has a pair of upstanding side tangs 56 and 58 and a rear tang 60. The front end of the pivot arm 16 is snapped into place between the tangs 56, 58 and 60 as seen in FIGS. 6 and 7. Extending laterally outwardly from the opposite sides of the central portion 55 are a pair of wing sections 62 and 64 each of which terminate with identical end sections 66. As best seen in FIGS. 4 and 10, each end section 66 has the front end thereof formed with a downwardly curved clip 68 to the rear of which is a spring member 70. The rear end of each end section 66 is formed with a tail portion 72 which in the unflexed position seen in FIG. 10, is located at an angle of approximately 30 degrees relative to the main flat body of the spring plate member 14.

Figure 3:
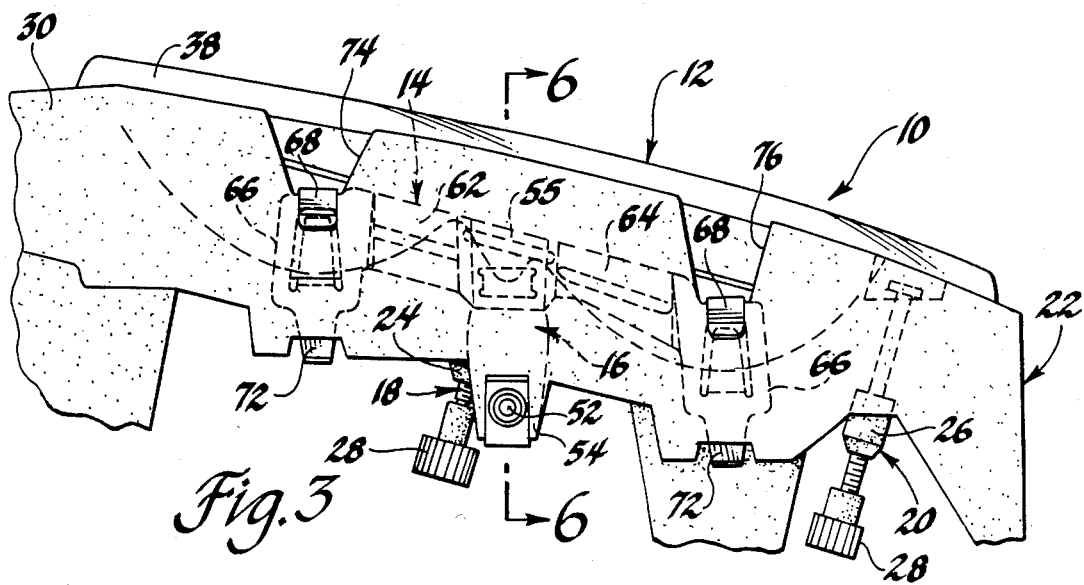
FIG. 3 is a bottom view of the headlamp assembly taken on line 3—3 of FIG. 1.
Figure 5:
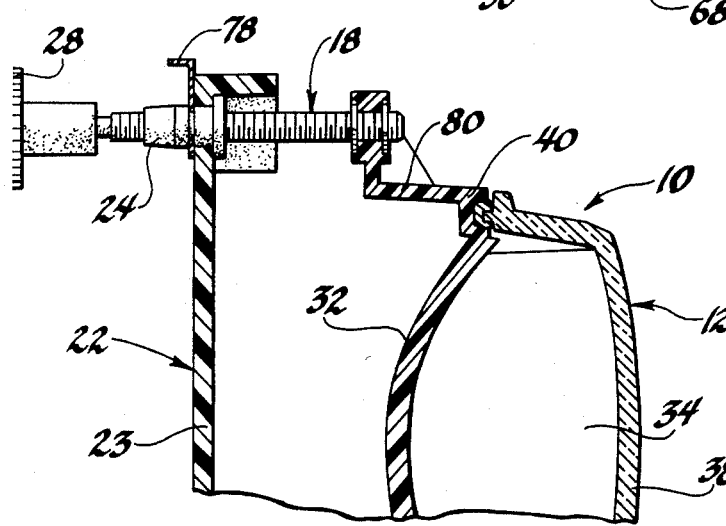
FIG. 5 is an enlarged section view taken on line 5—5 of FIG. 1 showing one of the adjustment screws incorporated with the headlamp assembly.

When the headlamp assembly 10 is shipped to the vehicle assembly plant, the lamp body 12 has the pivot arm 16 connected thereto as seen in FIG. 6 and the spring plate member 14 is clamped to the lower front end of the pivot arm 16 as seen in FIG. 7. In addition, the two spring members 70 of the spring plate member 14 receive the pair of support shoes 42 formed with the reflector member 32 in the manner shown in FIG. 4. In installing the headlamp assembly 10 into the support panel 22 of the vehicle, the tail portions 72 of the spring plate member 14 are initially inserted into pre-located laterally spaced accommodating slots formed in the wall 23 of the support panel 22 and the headlamp assembly 10 is pushed rearwardly while pressing the front end of the lamp body 12 downwardly so as to cause the two clips 68 to move into accommodating cutout portions 74 and 76 as seen in FIG. 3 and clip unto the lower wall 30 of the support panel 22 as seen in FIG. 4. Afterwards, the retainer nuts 24 and 26 are passed through appropriately positioned apertures formed in the back wall 23 and each is locked thereto by a U-shaped lock clip 78 such as shown in FIG. 5. Once the headlamp assembly 10 is connected to the support panel 22 it assumes the position seen in FIGS. 1, 2 and 3 after which adjustment of the knobs 28 associated with the adjustment screws 18 and 20 permit the lamp body 12 to be selectively adjusted about the vertical aim axis B and the horizontal aim axis A. In this regard, it will be noted that as seen in FIG. 5, the flange 80 integral with the top portion of the reflector member 32 has a U-shaped slot into which a flexible plastic retainer 82 is located and also, as seen in FIG. 6, the pivot arm 16 is similarly made from a plastic material which permits the pivot arm 16 to experience limited flexing movement when the lamp body 12 is positioned about the horizontal aim axis A.

Various changes and modifications can be made in this construction without departing from the spirit of the invention. Such changes and modifications are contemplated by the inventors and they do not wish to be limited except by the scope of the appended claims.

The embodiments of the invention in which the exclusive property or privilege is claimed are defined as follows:

1. The combination of a lamp body mounted to a support panel at the front end of a motor vehicle so as to allow selective adjustable movement of said lamp body about a vertical aim axis and a horizontal aim axis, said support panel including a substantially vertically oriented wall and a substantially horizontally oriented wall, said lamp body including a reflector member formed with first and second parabolic cavities located side by side for providing light beams forwardly of the motor vehicle, first and second support shoes secured to said reflector member below said first and second cavities, respectively, a spring plate member formed with a pair of laterally spaced clips which fasten said spring plate member to the frontal portion of said horizontally oriented wall of said support panel and having a pair of spring members biasing said first and second support shoes towards engagement with said horizontally oriented wall, a pivot arm fixed to said spring plate member between said pair of spring members and having its rear end fastened to said horizontally oriented wall of said support panel so as to cooperate with said pair of clips and prevent movement of said spring plate member relative to said support panel, the front end of said arm serving to accommodate a stud member secured to said reflector member so as to allow adjustable movement of said lamp body about said vertical aim axis while permitting said support shoes to slide fore and aft of the associated spring members during such adjustable movement of said lamp body.

2. The combination of a lamp body mounted to a support panel at the front end of a motor vehicle so as to allow selective adjustable movement of said lamp body about a vertical aim axis and a horizontal aim axis, said support panel including a substantially vertically oriented wall and a substantially horizontally oriented wall, said lamp body including a reflector member, first and second support shoes secured to said reflector member, each of said support shoes having a curved lower surface, a spring plate member formed with a pair of laterally spaced clips which fasten said spring plate member to the frontal portion of said horizontally oriented wall of said support panel and having a pair of spring members biasing said curved lower surface of each of said first and second support shoes towards engagement with said horizontally oriented wall, a pivot arm having its front end fixed to said spring plate member between said pair of spring members and having its rear end fastened to said horizontally oriented wall of said support panel so as to cooperate with said pair of clips and prevent movement of said spring plate member relative to said support panel, said front end of said pivot arm serving to accommodate a stud member secured to said reflector member so as to allow adjustable movement of said lamp body about said vertical aim axis while permitting said support shoes to slide fore and aft relative to the associated spring members during such adjustable movement of said lamp body.

3. The combination of a lamp body mounted to a support panel at the front end of a motor vehicle so as to allow selective adjustable movement of said lamp body about a vertical aim axis and a horizontal aim axis, said support panel including a substantially vertically oriented wall and a substantially horizontally oriented wall, said lamp body including a reflector member formed with first and second parabolic cavities located side by side for providing light beams forwardly of the motor vehicle, first and second support shoes secured to said reflector member below said first and second cavities, each of said support shoes having a curved lower surface, respectively, a spring plate member formed with a pair of laterally spaced clips which fasten said spring plate member to the frontal portion of said horizontally oriented wall of said support panel and having a pair of spring members biasing said curved lower surface of each of said first and second support shoes towards engagement with said horizontally oriented wall, a pivot arm having its front end fixed to said spring plate member between said pair of spring members and having its rear end fastened to said horizontally oriented wall of said support panel so as to cooperate with said pair of clips and prevent movement of said spring plate member relative to said support panel, said front end of said arm serving to accommodate a stud member secured to said reflector member so as to allow adjustable movement of said lamp body about said vertical aim axis while permitting said support shoes to slide fore and aft of the associated spring members during such adjustable movement of said lamp body.

* * * * *